United States Patent Office 3,845,198
Patented Oct. 29, 1974

---

3,845,198
ACICULAR GAMMA IRON OXIDE PROCESS
Guy G. Marcot, Alhambra, Calif., assignor to Bell & Howell Co., Pasadena, Calif.
No Drawing. Filed May 3, 1972, Ser. No. 249,923
Int. Cl. C01g 49/02, 49/06
U.S. Cl. 423—634          2 Claims

ABSTRACT OF THE DISCLOSURE

An improvement in the preparation of acicular, magnetic gamma ferric oxide in which precursor $\alpha$-FeOOH is prepared from seed crystals of $\alpha$-FeOOH precipitated by oxidation of ferrous ion in a solution containing an amount of alkali at least 15% in excess of a stoichiometric amount to convert the ferrous ion to ferric ion. The seed crystals are prepared at a temperature lower than 50° C. whereas the precursor is prepared therefrom at a temperature of at least 60° C. The magnetic gamma ferric oxide prepared therefrom is characterized by improved coercivity and a particle length of less than 1 micron, at least 70% of the particles having a length to width ratio of at least 10:1.

FIELD OF THE INVENTION

The fields of art to which the invention pertains include the fields of crystal formation, iron oxide chemistry and magnetic materials.

BACKGROUND AND SUMMARY OF THE INVENTION

Magnetic sound recording and reproducing techniques exhibit an ever growing need for operating with very low wavelengths and continuing improvement in precision tapes especially in obtaining higher outputs and lower noise characteristics. These characteristics are related to the coercivity value of the magnetic material, which, in turn, is related to the acicularity of the magnetic material and in particular inversely to the width of the acicular particle. The noise level of a tape is related to the "irregularities" which can be characterized as aggregates, agglomerates, coagulated particles, voids, and the like, and to the particle size distribution of the magnetic material in the coating.

Magnetic gamma ferric oxide has long been used as a sound carrier for magnetic recording, e.g., see Camras Pat. 2,694,656. Typically, the gamma ferric oxide is obtained by reducing $\alpha$-FeOOH to ferrosoferric oxide, $Fe_3O_4$, which is then oxidized to the magnetic ferric oxide, $\gamma$-$Fe_2O_3$. The precursor $\alpha$-FeOOH is grown from seed crystals by aerating the seed slurry in the presence of an acidic solution containing ferrous salts while continually controlling the degree of acidity. In some methods, ferrous salts are directly utilized and the degree of acidity is monitored by continuous addition of alkali; other methods utilize corroding scrap iron as the source of reactants. In the latter method, the sulfuric acid reacts with the scrap iron to produce ferrous sulfate which is oxidized to $\alpha$-FeOOH, releasing sulfuric acid to react with more scrap iron to replenish the ferrous sulfate. In this regard, reference can be made to U.S. Pats. 1,368,748 and 2,388,659.

Typically, the seed crystals of $\alpha$-FeOOH are obtained by the partial neutralization of a ferrous salt with alkali followed by aerating. See, in this regard, U.S. Pats. 3,252,758, 3,272,595 and 2,939,767. The reaction producing ferrous hydroxide for oxidation to FeOOH which takes place can be expressed as follows:

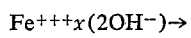
$$(1-x)\mathrm{Fe^{+++}} + x\mathrm{Fe(OH)_2} + (x-1)(2\mathrm{OH^-})$$

wherein $x$ is less than 1. In U.S. Pat. 2,560,970, a solution of ferrous sulphate is heated to a temperature above 65° C. and ferrous ion is precipitated by the rapid addition of a stoichiometric amount of alkali. In U.S. Pat. 3,288,563 excess alkali is used to directly precipitate the precursor $\alpha$-FeOOH without seeding. In U.S. Pats. 2,785,991, 2,866,686, 3,009,821 and 2,938,927 red iron oxide for use as pigments in paint, rubber and the like is obtained from a starting seed prepared with a critical proportion of alkali of between 0.9 and 1.1 equivalent parts per equivalent part of iron salt, greater or lesser proportions of alkali resulting in the growth of yellow $\alpha$-FeOOH from the seed. Other patents in which a pigment is produced, using excess alkali, but without seed preparation as such, include U.S. Pats. 2,558,302, 2,558,303, 2,558,304 and 2,696,466. In U.S. Pat. 3,075,919, a drastic excess (at least 100% over the stoichiometric amount) of alkali is used to prepare seeds from a ferric salt, rather than a ferrous salt, and crystal growth proceeds exclusively by digestion in an excess of alkali metal hydroxide. Other patents of interest include U.S. Pat. Nos. 3,382,174, 2,111,727, 2,443,765, 2,631,085, Re 24,173, 3,395,993, 3,539,294, 3,549,321 and 3,619,137.

The present invention provides magnetic $\gamma$-$Fe_2O_3$ of improved coercivity and high aspect ratio, i.e., length to width ratio, for the production of low noise, high fidelity magnetic tape. The invention involves a process wherein precursor $\alpha$-FeOOH is reduced to $Fe_3O_4$ followed by oxidation to magnetic $\gamma$-$Fe_2O_3$. However, magnetic oxides of improved properties are obtained by the critical step of preparing seed crystals for the growth of the precursor $\alpha$-FeOOH by oxidizing ferrous ion in a solution containing an amount of alkali at least 15% in excess of stoichiometric amount. The seed so produced has novel characteristics and consists essentially of very fine, uniformly small elongated particles which give rise to precursor $\alpha$-FeOOH particles of less than 1 micron length and wherein at least 70% of the particles have an aspect ratio of at least 10:1.

The slurries of seed crystals are neutralized or made acidic and are then used in any of the usual processes for preparing precursor $\alpha$-FeOOH followed by reduction to $Fe_3O_4$ and oxidation to magnetic $\gamma$-$Fe_2O_3$. As a result of the uniformly fine structure of the acicular particles, the resultant magnetic oxide has improved coercivity.

DETAILED DESCRIPTION

An essential feature of the invention is the preparation of the seed $\alpha$-FeOOH in the presence of at least 15% stoichiometric excess of alkali. To obtain the seed, sufficient alkali is added to a solution of ferrous salt to meet the foregoing requirements, followed by oxidation (generally by aeration), at temperatures low enough to allow the ferrous ion to be oxidized to ferric ion. The in-situ environment of seed making invariably allows the ferric species to be of the $\alpha$-FeOOH phase, and in acicular form.

One can use any ferrous salt having acceptable solubility in the alkaline solution under the conditions referred to, such as ferrous bromide, ferrous chloride, ferrous iodide, ferrous nitrate, ferrous sulfate, particularly the hydrated forms thereof such as the pentahydate, heptahydrate and nonahydrate, and ferrous thiosulfate. The hydrated forms of ferrous sulfate, such as copperas, are particularly advantageous in view of their solubility, ready availability, and lack of adverse anion effect under the excess alkali conditions utilized. Although aqueous solutions are convenient and preferred, alcoholic solutions or other supporting medium in which the salt is soluble can be used provided, of course, the alkali is also soluble therein. Generally, one uses a concentration of about ¼–2 lbs./gal. of the ferrous salt, calculated as FeOOH. At the higher concentrations, some ferrous salt may be undissolved so that the solution is in the form of a slurry.

For alkali, one can use any alkaline material which is soluble in the supporting medium and which will act as a source of hydroxyl ion for the precipitation of $\alpha$-FeOOH. Examples include ammonium hydroxide, the basic forms of alkali metals and alkaline earth metals, such as the hydroxides, carbonates, and the like of sodium, potassium, lithium, calcium, barium, strontium, and the like. Ammonium hydroxide and the basic forms, particularly the hydroxides, of the alkali metals such as sodium, potassium and lithium are preferred as providing minimum anion interference with the process. An amount of alkali is added which represents at least a 15% stoichiometric excess over the amount of ferrous ion to be reacted.

While it is not intended to rely on any particular theoretical considerations, it is believed that as a result of the use of excess alkali in at least the proportions above stated, the seed crystals are produced with substantially "clean" crystal faces, i.e., of high purity and free of combined anion and that this gives rise to the advantageous properties of the resultant $\gamma$-Fe$_2$O$_3$.

Conveniently, separate solutions of the ferrous salt and alkali are prepared and then mixed followed by oxidation. Any source of free oxygen such as oxygen itself, air or other gaseous mixtures containing oxygen can be utilized to effect oxidation of the ferrous species to the ferric species for precipitation as $\alpha$-FeOOH. Chemical oxidants can be used such as peroxides, chlorates or perborates, or the like, but simple aeration is preferred for its convenience and to avoid the introduction of adverse cations. As the alkaline solution of ferrous salt is being aerated or otherwise oxidized, the mixture forms a thick slurry, aeration being terminated when oxidation is essentially completed. Importantly, the temperature of the oxidative conversion is maintained below 50° C. There is no meaningful lower limitation except as determined by reaction rates, but there is no desirable reason to conduct the reaction below room temperature. The aeration takes about 15 minutes to about 20 hours, depending upon the temperature and reagents.

After completion of the oxidation step, the seed crystals of $\alpha$-FeOOH can be used for the growth of precursor crystals of $\alpha$-FeOOH which, in turn, can be reduced to Fe$_3$O$_4$ and then oxidized to magnetic $\gamma$-Fe$_2$O$_3$. The precursor crystals of $\alpha$-FeOOH are grown under acidic conditions. Therefore, a slury of the seed crystals obtained under the excess alkali conditions as outlined above should be neutralized or made acidic. The reagent necessary for the growth of precursor crystals of $\alpha$-FeOOH can be added directly to the seed preparation solution after acidification thereof, e.g., by adding an appropriate amount of H$_2$SO$_4$.

In the precursor crystal growth stage, the seed crystals are combined with a source of ferrous ion in acidic solution while concurrently aerating, or otherwise supplying free oxygen, and incrementally adding alkali. This is in accordance with any of the patents referred to above relating to such crystal growth; this aspect of the process not constituting a part of the invention as such. Thus, one can use an acid solution of ferrous salt directly or one can use corroding scrap iron as the source of reactants, as outlined hereinbefore. Advantageously, by using the seed crystals obtained in accordance with the present invention, substantially smaller amounts of seed crystals are needed to obtain $\alpha$-FeOOH precursor crystals. Thus, the seed crystals can constitute only about 10% of the crystal growth solution, compared to a conventional procedure using about 25% seed crystals. Furthermore, the total time for oxidation is found to be as much as 50% lower than that required with the conventional procedures to maintain an identical pH environment.

For precursor crystal growth, the seed pH of the solution is reduced by the addition of an acid, such as sulfuric acid, to obtain a pH which is typically about 3.5 pH, but can be as high as 5 pH or as low as 2 pH. The precursor $\alpha$-FeOOH is preferably grown at a temperature of at least 60° C., and can be prepared at temperatures as high as several hundred degrees with the application of pressure.

For crystal growths at the same weight percent of seed, the slurry from the precursor growth operation is generally thicker than that obtained from conventional procedures, indicating that the seed prepared in accordance with the present invention is considerably finer and more surface receptive at its crystal faces. The precursor crystals obtained have an improved aspect ratio compared to crystals obtained by conventional procedures. As is well known in the art, the average size of the crystal growth particle is dependent and controlled by the amount of seed employed; the higher the amount of seed, the smaller is the average particle size. In one typical embodiment of the present invention, a precursor is produced with an average particle length of 0.6 micron and an average length to width ratio of about 12. The precursor $\alpha$-FeOOH particles are found to consist of uniformly small, elongated particles less than 1 micron long and having an average length to width ratio of at least 10:1, at least 70% of the particles having a length to width ratio of at least 10:1.

The Fe$_3$O$_4$ and the $\gamma$-Fe$_2$O$_3$ are pseudomorphic to the precursor $\alpha$-FeOOH so that the foregoing dimensional characteristics are carried through to the Fe$_3$O$_4$ and $\gamma$-Fe$_2$O$_3$ after the reduction and oxidation steps outlined above. Coercivity values are, of course, dependent upon the method used for measurement. For convenience and for uniformity for comparison purposes, one can compress the crystals in bulk, dry powder form to a predetermined density, e.g., 1.3, and determine the coercivity with a B–H meter. Under these conditions, magnetic $\gamma$-Fe$_2$O$_3$ obtained utilizing seed crystals prepared in accordance with the present invention typically have coercivity values 20% higher or more than that obtained with conventionally prepared material. Generally the coercivity is at least 300 oersteds.

The magnet $\gamma$-Fe$_2$O$_3$ can be applied to a plastic tape to obtain a magnetic recording tape, using any prior art method.

The invention is illustrated further by the following examples.

As is well known in the art, the average particle size of the seed crystal is dependent upon many variables which are each controlled for a particular objective. Generally, the average size is smaller when: (1) the temperature is lower; (2) the concentration is lower; and (3) the agitation and aeration rates are higher. Consequently, for the examples illustrating the invention, all conditions were held constant and only the compositions were varied. The constant conditions were:

(1) a temperature of 33° C. for the initial precipitation of the ferrous salt with alkali.
(2) a temperature of 33° C. during aeration.
(3) a constant volume rate of 3L/min. for the aeration, discharged through a semi-coarse fritted glass tube.
(4) a constant concentration of precipitated ion equivalent to 20 grams/L FeOOH during the initial precipitation and aeration steps.

EXAMPLE 1

A solution was prepared by dissolving 347 grams of copperas (FeSO$_4$·7H$_2$O) in 2.5 liters of deionized water at 33° C. Another solution was prepared by dissolving 150 grams of sodium hydroxide in 2.5 liters of deionized water at 33° C. The two solutions were combined over a period of about 5 minutes at 33° C. and the final volume adjusted to 5.55 liters. Air from an instrumentation air supply was applied through a pressure reducer and liquid trap to aerate the combined solutions at 3 liters per minute air flow at about 33° C., maintaining the volume at 5.55 liters. Aeration time was 4 hours to yield 111 grams of α-FeOOH seed crystals and the pH at the end of aeration was found to be about 13. The resultant slurry was neutralized by the addition of 716 milliliters of 5% sulfuric acid, resulting in an adjustment of the pH from about 13 to 3.6 and was further diluted to 6 liters by the addition of deionized water.

To grow the precursor crystals of α-FeOOH, 750 grams of copperas were dissolved in 1,750 milliliters of acidified seed slurry prepared above (containing about 20 weight percent seed based on the total batch weight), over a period of about 5 minutes and the total volume was adjusted with deionized water to about 5 liters. The mixture was heated to 90° C. and aerated with the same air supply as above at about 5 liters per minute of air flow, while maintaining the pH at about 3.5±0.2 until 300 grams of α-FeOOH had precipitated.

The precursor α-FeOOH so prepared was filtered, washed and dried and 250 grams thereof were crushed and sifted through a 10 mesh screen, charged to a standard conversion kiln and processed using standard procedures for reducing to $Fe_3O_4$ followed by oxidation to $\gamma\text{-}Fe_2O_3$. The resultant $\gamma\text{-}Fe_2O_3$ was compressed as bulk, dried powder to a density of 1.3 and inserted in a B–H meter whereupon the coercivity was found to be 333.

EXAMPLE 2

Seed crystals of α-FeOOH were prepared following the procedure of Example 1. Precursor crystals of α-FeOOH were grown in accordance with the procedure of Example 1 except that only 10 weight percent of the seed was used, rather than 20 weight percent as in Example 1 and processing time was 11 hours rather than 7.5 hours. Magnetic $\gamma\text{-}Fe_2O_3$ was prepared from the precursor crystals in accordance with Example 1 to yield a magnetic oxide having a coercivity of 328.

EXAMPLE 3

For comparison purposes, the procedure of Example 1 was repeated except that: (1) an excess copperas solution was used to form the seed crystals (specifically, 35 weight percent of the stoichiometric amount of alkali was used) and required aeration time was 8 hours, the resultant solution having a pH of 3.5; and (2) 25 weight percent of seed crystals was used in preparing the precursor α-FeOOH requiring 15 hours of aeration for complete crystal growth. After reduction and oxidation, the resultant magnetic $\gamma\text{-}Fe_2O_3$ had a coercivity of 272.

The following table sets forth a comparison of the processing conditions and properties of the magnetic oxides prepared in accordance with Examples 1–3.

TABLE

| Example | 1 | 2 | 3 |
|---|---|---|---|
| Seed: | | | |
| Alkali, percent stoichiometric | 150 | 150 | 35 |
| Aeration temperature, °C | 33 | 33 | 33 |
| Aeration time, hours | 4 | 4 | 8 |
| pH, end of aeration | (¹) | (¹) | 3.5 |
| Crystal: | | | |
| Percent, seed | 20 | 10 | 25 |
| Temperature, °C | ²90 | ²90 | ²90 |
| pH, ±0.2 | 3.5 | 3.5 | 3.5 |
| Time, hours | 7.5 | 11 | 15 |
| $\gamma\text{-}Fe_2O_3$: | | | |
| Coercivity ³ | 333 | 328 | 272 |
| Percent, standard | 122 | 121 | 100 |

¹ About 13.
² Plus or minus two.
³ Bulk, dry powder, density=1.3.

For purposes of comparison with commercially available magnetic iron oxides, the following type of $\gamma\text{-}Fe_2O_3$ was also evaluated at a bulk, dry powder density of 1.3.

| Sample | Coercivity | Percent standard |
|---|---|---|
| Example 3 (reference standard) | 272 | 100 |
| K-300, Hercules "good quality general purpose audio" oxide | 272 | 100 |
| MO-2530, Pfiser's "low noise, small particle size" oxide | 264 | 97 |
| K-500, Hercules "low noise, small particle size" oxide | 285 | 105 |

What is claimed is:

1. In a process for the preparation of acicular, magnetic $\gamma\text{-}Fe_2O_3$ by reduction of precursor α-FeOOH to $Fe_3O_4$ followed by oxidation to said $\gamma\text{-}Fe_2O_3$, wherein said precursor α-FeOOH is prepared by oxidizing ferrous ion in an acidic crystal growth liquid solution, in the presence of seed crystals of α-FeOOH added thereto, while adding alkali to said acidic crystal growth solution to precipitate said precursor α-FeOOH, said seed crystals being prepared by oxidation of ferrous ion in a seed preparation liquid solution containing alkali, the improvement, wherein (a) said seed crystals are prepared at a temperature lower than 50° C., (b) said seed preparation solution contains an amount of alkali at least 15% in excess of a stoichiometric amount required for oxidative conversion of said ferrous ion to ferric ion and (c) acid is added to said seed preparation solution after full oxidative preparation of said seed crystals, but before addition of said seed crystals to said crystal growth solution, to lower the pH of said seed preparation solution to 2–5.

2. The improvement according to Claim 1 wherein the alkali in said seed preparation solution is selected from ammonium hydroxide and the hydroxides and carbonates of an alkali metal.

References Cited

UNITED STATES PATENTS

| | | | |
|---|---|---|---|
| 2,574,459 | 11/1951 | Bennetch | 423—633 |
| 2,939,767 | 6/1960 | Martin | 423—633 |
| 2,716,595 | 8/1955 | Marsh (I) | 423—633 |
| 2,633,407 | 3/1953 | Marsh (II) | 423—633 |
| 3,015,627 | 1/1962 | Ayers et al. | 117—235 |
| 3,015,628 | 1/1962 | Ayers et al. | 117—235 |
| 3,652,334 | 3/1972 | Abeck et al. | 252—62.56 |
| 3,288,563 | 11/1966 | Klomp et al. | 423—634 |
| 3,075,919 | 1/1963 | Gruber et al. | 423—634 |
| 3,549,321 | 12/1970 | Everett | 423—140 |

FOREIGN PATENTS

| | | | |
|---|---|---|---|
| 51,835 | 9/1966 | Poland | 423—634 |
| 1,221,434 | 2/1971 | Great Britain | 423—634 |
| 701,433 | 12/1953 | Great Britain | 423—633 |
| 1,250,804 | 9/1967 | West Germany | 423—634 |
| 1,133,863 | 11/1968 | Great Britain | 423—633 |

EARL C. THOMAS, Primary Examiner

B. E. HEARN, Assistant Examiner

U.S. Cl. X.R.

423—143, 633; 252—62.56